United States Patent [19]

Barker et al.

[11] Patent Number: 5,046,001
[45] Date of Patent: Sep. 3, 1991

[54] METHOD FOR ACCESSING SELECTED WINDOWS IN A MULTI-TASKING SYSTEM

[75] Inventors: Barbara A. Barker, Round Rock; Thomas R. Edel, Austin; Jeffrey A. Stark, Grapevine, all of Tex.

[73] Assignee: IBM Corporation, Armonk, N.Y.

[21] Appl. No.: 213,421

[22] Filed: Jun. 30, 1988

[51] Int. Cl.⁵ .......................... G06F 3/00; G06F 15/00
[52] U.S. Cl. ................................ 364/200; 364/225.6; 364/927.63; 364/521; 340/721
[58] Field of Search ... 364/200 MS File, 900 MS File, 364/518, 521; 340/721

[56] References Cited

U.S. PATENT DOCUMENTS

| | | | |
|---|---|---|---|
| 4,555,775 | 11/1985 | Pike | 364/900 |
| 4,642,790 | 2/1987 | Minshull et al. | 364/900 |
| 4,648,062 | 3/1987 | Johnson et al. | 364/900 |
| 4,653,020 | 3/1987 | Cheselka et al. | 364/900 |
| 4,712,191 | 12/1987 | Penna | 364/900 |
| 4,819,189 | 4/1989 | Kikuchi et al. | 364/521 |
| 4,829,294 | 5/1989 | Iwami et al. | 340/723 |

Primary Examiner—Thomas C. Lee
Assistant Examiner—Ayni Mohamed
Attorney, Agent, or Firm—Andrew J. Dillon

[57] ABSTRACT

A method for selectively accessing a particular one of a plurality of computer applications which are simultaneously active and displayed in a plurality of overlapping viewports or windows in a multi-tasking system. User inputs to the system are monitored to determine the position of a cursor within a window or the location of an attempted data input to a window and the particular window thus selected is displayed unencumbered by promoting it to the uppermost display position in accordance with the state of a display attribute associated with that window. Thereafter, the display attribute is utilized to determine whether or not the selected window returns to its previous display position or remains in the uppermost display position in response to the movement of the cursor or the attempt by a user to input data into a second selected window.

4 Claims, 2 Drawing Sheets

METHOD FOR ACCESSING SELECTED WINDOWS IN A MULTI-TASKING SYSTEM

BACKGROUND OF THE INVENTION

1. Technical Field

The present invention relates in general to methods for efficient access to multiple computer application programs and in particular to methods for efficient access to computer application programs in a multi-tasking system having a plurality of applications simultaneously active and displayed in a plurality of overlapping windows.

2. Background Art

A relatively recent advance in the computer arts allows a user to simultaneously access, display and manipulate data from a variety of related and/or unrelated computer application programs. This process is generally referred to as "multi-tasking." In a true multi-tasking system, several application programs are active simultaneously. Multi-tasking has been simulated on some of the less powerful personal computers in that, only one application is in fact active at any one time, but the user interface presents the effective appearance of multi-tasking. Activity relating to each application is generally displayed in a viewport or "window." These windows may overlap and partially or completely obscure each other and the data therein, or may be presented in a visually discreet, i.e. non-overlapping manner. Optionally, the user may work with data in any of the open windows by changing the active work area. Examples of windowing multi-tasking programs include Windows TM, published by Microsoft Corp. and DesQview TM, published by QuarterDeck Office Systems. Both of these windowing multi-tasking systems support the IBM Personal System 2 (PS/2) series of personal computers.

There are, however, certain inherent problems in most such multi-tasking systems. In order to reach the data which the user desires to manipulate, the user must often follow a different and sometimes complicated procedure for each application program and, within each program, at each level of data type, such as file, page, or word, which the user attempts to access. Consequently, the user faces a loss of time due to the number of key strokes necessary simply to obtain a visual image of the ultimate object data or, to input data in one program while working in a second program simply due to the time necessary for the system to respond to the various commands given it. Furthermore, the user's job is made more difficult due to the necessity of remembering a multiplicity of different interface and access procedures for different application programs and for different levels within the same application program. Finally, since many true multi-tasking systems allow access between any level of one active program to any level of another active program, such systems require an unusually large amount of resident memory in order to service such requests promptly and efficiently.

Certain application programs have attempted to solve these problems but have done so at the expense of various desirable features. For example, the HyperCard Program of Apple Computer discussed at length in *The Complete HyperCard Handbook*, by Danny Goodman, Bantam Books (1987), provides a simple means for avoiding a predetermined organization scheme when accessing object data, allowing direct linking of various disparate types of data at the user's command, via the activation of a "button." Although this program provides a uniform, simple and relatively swift method of interfacing between different types of data which may be stored in completely different formats, it suffers from an inability to display more than one type of object data at a time on the screen and suffers from a requirement for an enormous amount of resident memory and static storage capacity to function properly. Moreover, this program is designed to be a tool kit enabling users to design their own permanent links between data, thereby creating new applications rather than a program for providing access to different levels of data which are visually obscured within preexisting application programs which are not otherwise connected.

Another approach known in the art is the utility program published by SoftLogic Solutions as SoftwareCarousel. This program permits up to ten different application programs or data files to be loaded and allows the user to move from one to the other with a single keystroke. This utility program requires configuration by the user and is not a multi-tasking system.

Recently, a method for navigating between and within application programs resident in a multi-tasking computer system has been proposed which utilizes a direct cursor-controlled access to the multiple application programs. Utilizing this technique, two or more programs may be optionally linked together in an arbitrary sequence to form a chain. The user may then invoke a function resident in a computer system to directly access windows and programs in the chain which are running in a sequence determined by the order in which the user opens the window in a given session. In this manner, the user may access data within any single application program by viewing individual programs in a method controlled by a so-called "exploding" cursor function. While this system represents an improvement over known systems, it does not permit the user to simply and easily access a selected program among a plurality of multi-tasking applications without the necessity for previously linking together such programs so that this function may be utilized.

Still more recently, a method has been proposed for accessing visually obscured data in a multi-tasking system by selectively altering the display mode attribute of individual windows to render the interior of selected windows temporarily transparent. This process may be utilized repeatedly until such time as visually obscured data beneath a large number of overlapped applications may become visible. While this system permits visually obscured data to be displayed, it does not permit the user to simply and easily access individual applications from a plurality of applications which are simultaneously active and displayed within overlapping windows.

SUMMARY OF THE INVENTION

It is therefore one object of the present invention to provide an improved method of accessing one of a plurality of computer application programs which are simultaneously active in a multi-tasking environment.

It is another object of the present invention to provide an improved method of accessing one of a plurality of computer application programs which are simultaneously active in a multi-tasking environment which does not require a substantial number of keystrokes or user inputs.

It is yet another object of the present invention to provide an improved method of accessing one of a plurality of computer application programs which are simultaneously active in a multi-tasking environment which does not require excessive memory requirements.

The foregoing objects are achieved as is now described. The method of the present invention may be utilized for selectively accessing a particular one of a plurality of computer applications which are simultaneously active and displayed in a plurality of overlapping viewports or windows in a multi-tasking system. User inputs to the system are monitored to determine the position of a cursor within a window or the location of an attempted data input to a window and the particular window thus selected is displayed unencumbered by dynamically promoting it to the uppermost display position in accordance with the state of a display attribute which is associated with each window. Thereafter, the display attribute is utilized to determine whether or not the selected window returns to its previous display position or remains in the uppermost display position. In this manner, the position of a cursor or data input in combination with the state of the aforementioned display attribute may be utilized to simply and easily change the sequence of display of a plurality of windows to permit the user to access a desired window without the necessity of a large number of keystrokes.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
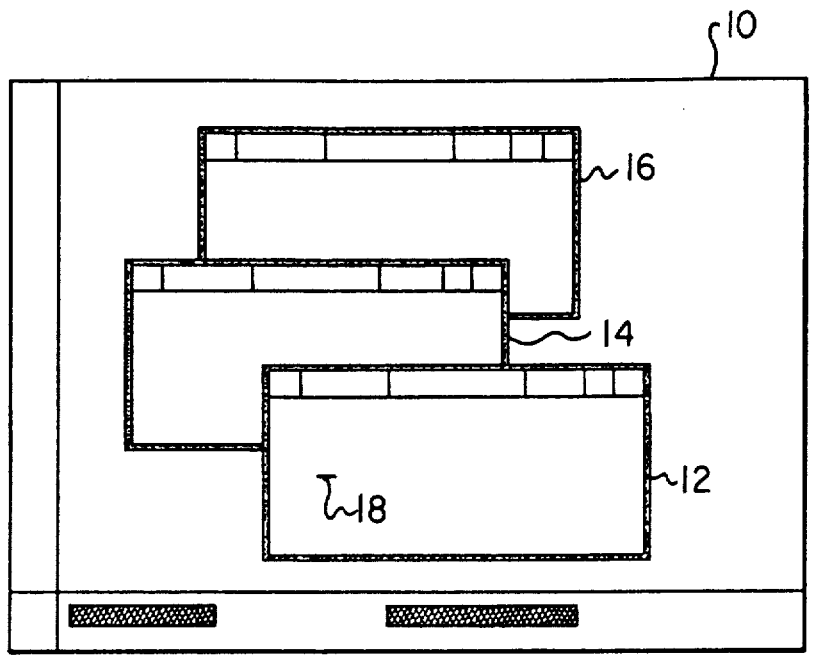
FIG. 1 is a pictorial representation of a plurality of overlapping windows within a computer display screen.

With reference now to the figures and in particular with reference to FIG. 1, there is depicted a pictorial representation of a computer display screen 10 upon which are displayed three viewports or windows 12, 14, and 16. Those skilled in the art of multi-tasking computer applications will appreciate that each window may represent a single computer application program such as a spread sheet program, a word processing application and a graphics application. Typically, windows 12, 14, and 16 may be displayed in an overlapping sequence which is generally dependent upon the order in which the applications were opened or called. That is, window 16 was initially opened and window 14, when opened, overlapped window 16. Next, window 12 was opened, overlapping window 14.

Those skilled in this art will appreciate that even while overlapped as depicted, the non-visible contents of each window are present in memory and are restored to the display of computer display screen 10 upon the rearrangement of windows 12, 14, and 16, as necessary.

In accordance with the method of the present invention, each window includes a display attribute associated therewith which may be utilized, in a manner which will be explained in greater detail herein, to selectively alter the display sequence of overlapped windows 12, 14, and 16 so as to permit a user to rapidly access a single one of the multiple displayed applications.

As is illustrated in FIG. 1, window 12 includes a cursor or mouse pointer 18 which is utilized, in a manner well known in the art, to indicate a selected position upon computer display screen 10. That position is illustrated and may be utilized to indicate the location at which data may be input by the user in accordance with known computer input techniques. Of course, cursor or mouse pointer 18 may be moved about on computer display screen 10 by utilizing a cursor key pad, a mouse input device, or standard keyboard inputs.

Figure 2:
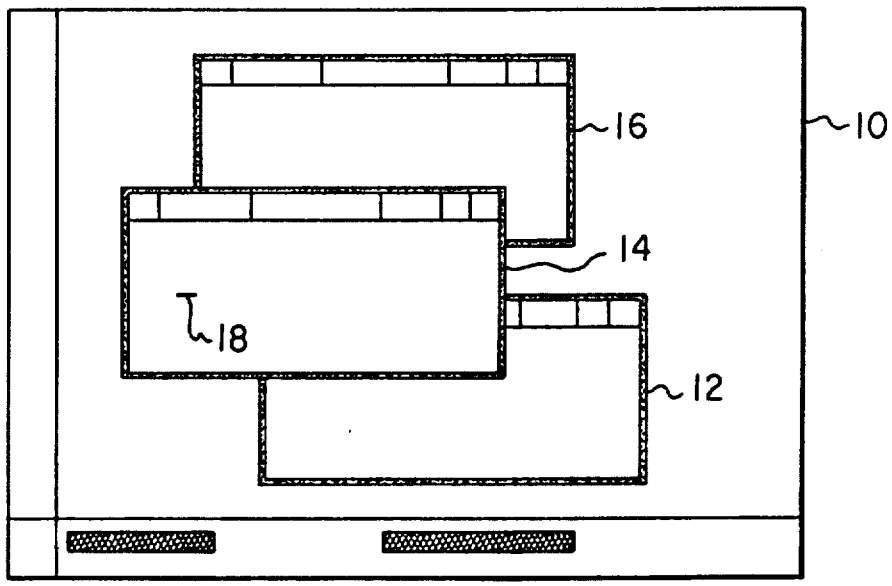
FIG. 2 is a pictorial representation of the plurality of windows within a computer display screen of FIG. 1 after they have been altered in display sequence in accordance with the method of the present invention.

Referring now to FIG. 2, there is depicted a second pictorial representation of computer display screen 10 wherein it may be seen that the user has relocated cursor or mouse pointer 18 to a location within window 14. In accordance with the method of the present invention, if the state of the display attribute associated with window 14 permits the promotion of window 14 to an unencumbered display in an uppermost display position, window 14 will be automatically altered in sequence to the uppermost position depicted. As may be seen, window 14 now overlies windows 12 and 16 and has become the "active" window, permitting the user to enter data and manipulate objects within window 14 in any manner permitted by that application.

Figure 3:
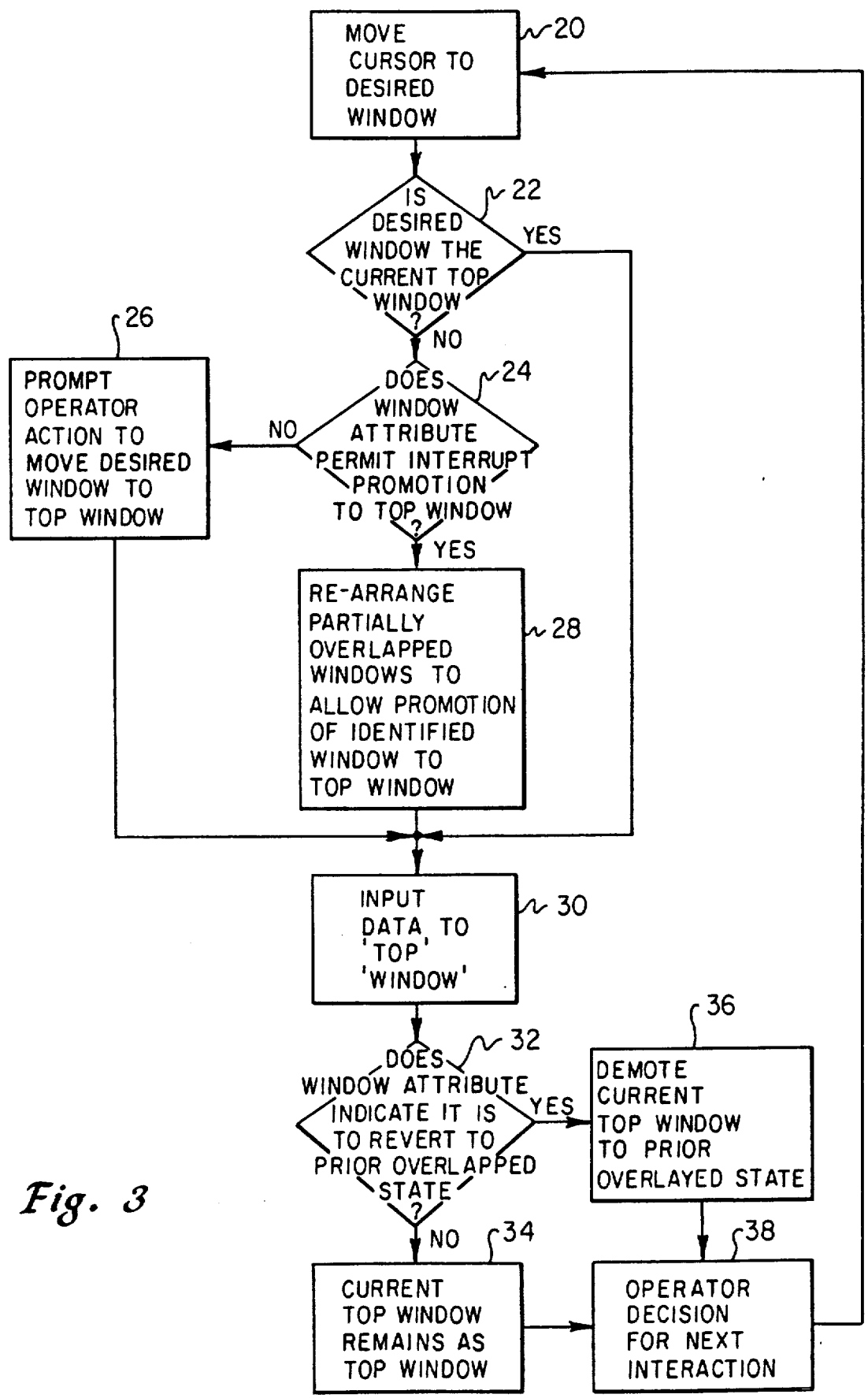
FIG. 3 is a logic flow diagram of the method of the present invention.

With reference now to FIG. 3, there is depicted a logic flow diagram which illustrates the method of the present invention. As can be see, the program begins by permitting the user to move cursor or mouse pointer 18 (see FIG. 1) to any desired window within computer display screen 10 as illustrated in block 20. Next, decision block 22 is utilized to determine whether or not the window within which cursor or mouse pointer 18 is located is the current top window. That is, the window which is displayed in the uppermost display position.

If the window in which cursor or mouse pointer 18 is currently located is the current top window, then the program proceeds to block 30 wherein the user is permitted to input data into that window. If not, decision block 24 is utilized to determine whether or not the display attribute associated with that window permits the interrupt promotion of that window to the top or uppermost window position.

If the display attribute associated with that window does not permit interrupt promotion to the uppermost window position, block 26 illustrates the prompting of the user to take those actions necessary to move the desired window to the uppermost or active position. Those skilled in the art will appreciate that this generally requires the user to deactivate or iconize the present uppermost window and activate the desired window utilizing appropriate keystrokes and commands. Thereafter, the user may input data to the desired window as illustrated in block 30.

Referring again to block 24, if the display attribute associated with the desired window permits the interrupt promotion of that window to the uppermost or active position, block 28 illustrates the automatic rearranging of the partially overlapped windows to promote the desired or identified window to the uppermost or active position. Thereafter, as above, the user may input data to the current uppermost window as illustrated in block 30.

After the user has concluded the inputting of data into the current uppermost window, as illustrated in block 30, block 32 is utilized to determine whether or not the display attribute associated with each window in accordance with the method of the present invention indicates that the window which has been promoted to the uppermost position must revert to its prior overlayed state. If so, block 36 indicates the demotion of that window to its prior overlayed state. If not, the window remains in the uppermost or active position, as illustrated in block 34. Thereafter, in either case, block 38 illustrates the program waiting for a user decision regarding the next interaction with the novel method of the present invention.

In accordance with the method of the present invention, those skilled in the art will appreciate that by associating a display attribute with each window in a display of multiple windows it is possible for the user to selectively alter the sequence in which the overlapped windows are displayed and instantaneously vary the window which is in the uppermost or active position. While there exists certain prior art systems which permit a user to enter data into those portions of an overlapped window which are still visible, such known systems will not permit the automatic activation of an overlapped window merely by the movement of a cursor into that window for data entry purposes. It should be appreciated that the method of the present invention permits the rapid and efficient access to any one of a plurality of multi-tasking computer applications which are displayed in a plurality of overlapping windows.

While the invention has been particularly shown and described with reference to a preferred embodiment, it will be understood by those skilled in the art that various changes in form and detail may be made therein without departing from the spirit and scope of the invention.

We claim:

1. A method of accessing one of a plurality of computer application programs which are simultaneously active and displayed on a computer system in a plurality of windows which at least partially overlap, said method comprising the steps performed by a computer system of:
   establishing a display attribute for at least a selected one of said plurality of windows, said display attribute having a first state which permits the provision of an unencumbered display of said selected one of said plurality of windows in response to the position of a cursor within said selected one of said plurality of windows and having a second state which prohibits said provision;
   monitoring user inputs to said computer system to determine if the position of a cursor is within said selected one of said plurality of windows; and
   upon the display attribute being in said first state automatically providing an unencumbered display of said selected one of said plurality of windows on said computer system in response to the position of said cursor therein in the event said selected one of said plurality of windows is at least partially overlapped and otherwise, upon on said display attributes being in said second state, the display of said selected one of said plurality of windows remaining unchanged.

2. The method according to claim 1 wherein said step of automatically providing an unencumbered display of said selected one of said plurality of windows on said computer system is accomplished by selectively altering the sequence in which said plurality of windows overlap.

3. A method of accessing one of a plurality of computer application programs which are simultaneously active and displayed on a computer system in a plurality of windows which at least partially overlap, said method comprising the steps performed by a computer system of:
   establishing a display attribute for at least a selected one of said plurality of windows, said display attribute permitting the provision of an unencumbered display of said selected one of said plurality of windows in response to the position of a cursor within said selected one of said plurality of windows;
   monitoring user inputs to said computer system to determine if the position of a cursor is within a selected one of said plurality of windows;
   automatically providing an unencumbered display of said selected one of said plurality of windows on said computer system solely in response to the position of said cursor therein in the event said selected one of said plurality of windows is at least partially overlapped by selectively altering the sequence in which said plurality of windows overlap; and
   automatically reverting the sequence in which said plurality of windows overlap to an original sequence in response to the removal of said cursor from said selected one of said plurality of windows.

4. A computer system for accessing one of a plurality of computer application programs which are simultaneously active and displayed on said computer system in a plurality of windows which at least partially overlap, said computer system comprising:
   a display attribute associated with at least a selected one of said plurality of windows, said display attribute having a first state which permits the provision of an unencumbered display of said selected one of said plurality of windows in response to the position of a cursor within said selected one of said plurality of windows and having a second state which prohibits said provision;
   means for monitoring user inputs to said computer system to determine if the position of a cursor is within said selected one of said plurality of windows; and
   means for automatically providing an unencumbered display of said selected one of said plurality of windows on said computer system upon the display attribute being said first state in response to the position of said cursor therein in the event said selected one of said plurality of windows is at least partially overlapped and otherwise, upon said display attributes being in said second state, the display of said selected one of said plurality of windows remain unchanged.

* * * * *

UNITED STATES PATENT AND TRADEMARK OFFICE
CERTIFICATE OF CORRECTION

PATENT NO. : 5,046,001

DATED : September 3, 1991

INVENTOR(S) : Barker et al.

It is certified that error appears in the above-identified patent and that said Letters Patent is hereby corrected as shown below:

Column 5, line 65, change "attributes" to --attribute--.

Column 6, line 62, change "attributes" to --attribute--.

Column 6, line 64, change "remain" to --remaining--.

Signed and Sealed this

Second Day of March, 1993

Attest:

STEPHEN G. KUNIN

Attesting Officer

Acting Commissioner of Patents and Trademarks